Figure 1:
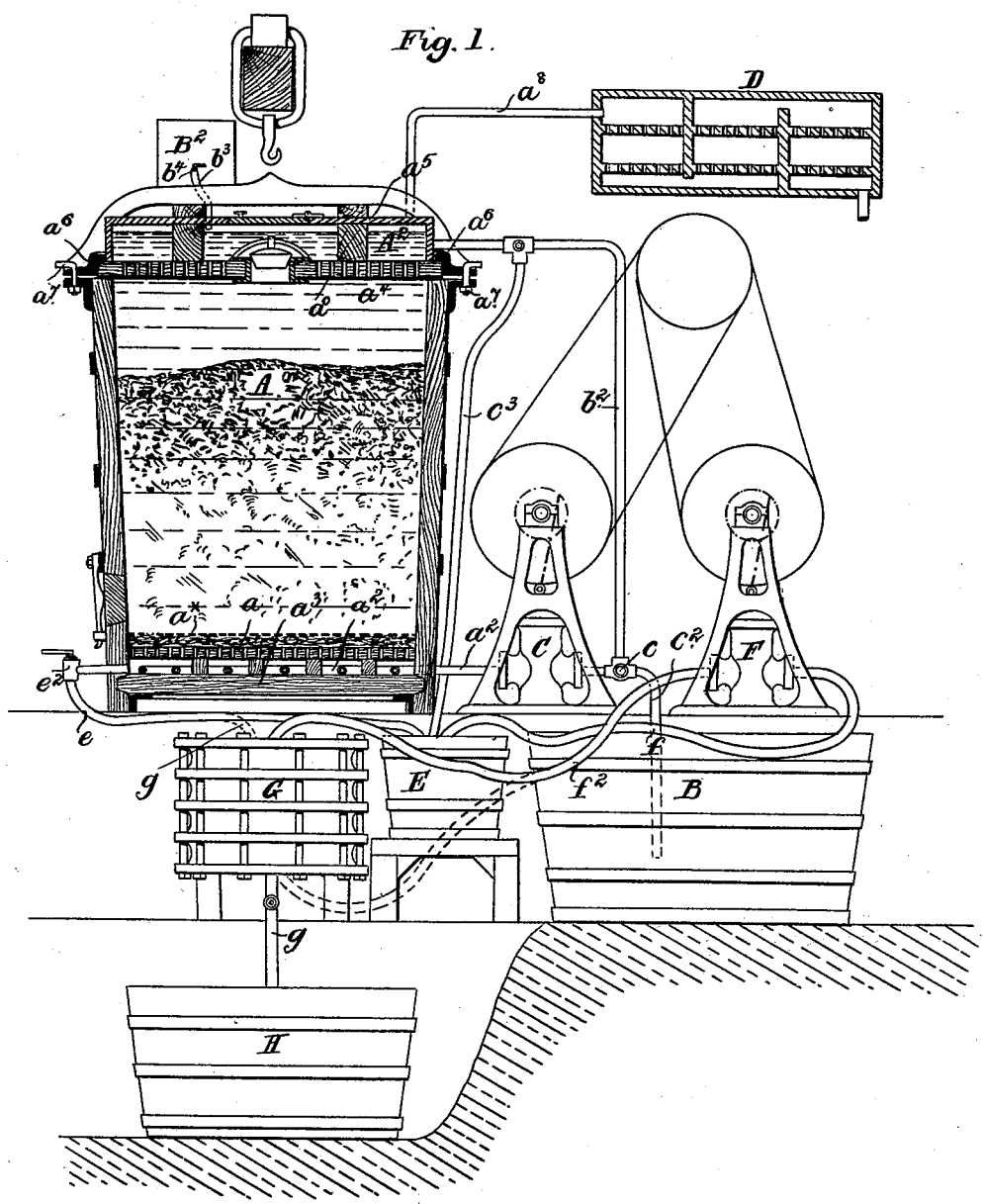

(No Model.) 2 Sheets—Sheet 1.

W. D. BOHM.
APPARATUS FOR THE SEPARATION OF GOLD FROM ORES CONTAINING IT.

No. 509,289. Patented Nov. 21, 1893.

Witnesses
John Revell
George Baumann

Inventor:
William D. Bohm
By his Attorneys
Howson and Howson (No Model.) 2 Sheets—Sheet 2.
W. D. BOHM.
APPARATUS FOR THE SEPARATION OF GOLD FROM ORES CONTAINING IT.
No. 509,289. Patented Nov. 21, 1893.
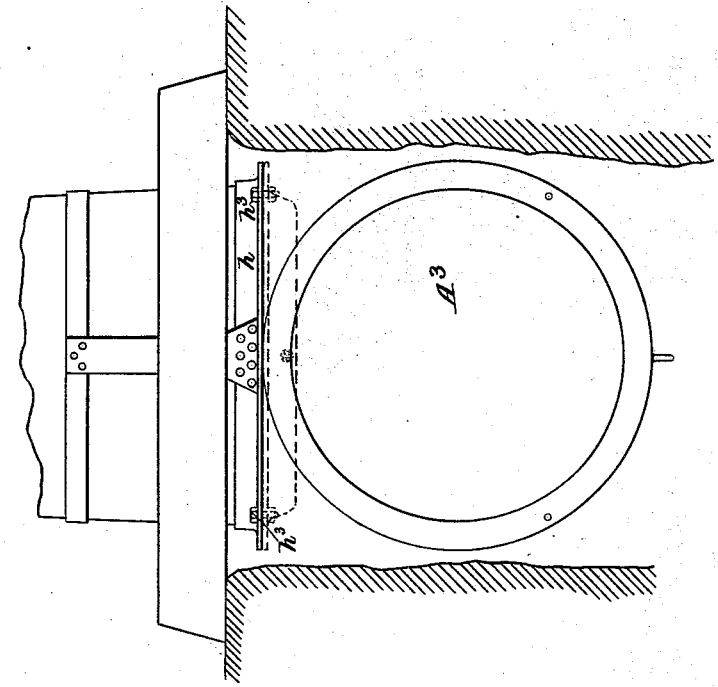
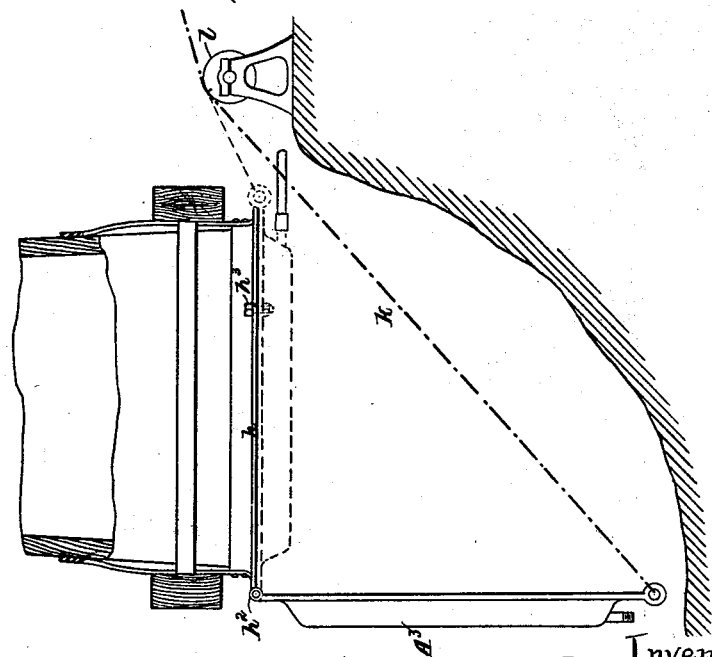

UNITED STATES PATENT OFFICE.

WILLIAM D. BOHM, OF LONDON, ENGLAND.

APPARATUS FOR THE SEPARATION OF GOLD FROM ORES CONTAINING IT.

SPECIFICATION forming part of Letters Patent No. 509,289, dated November 21, 1893.

Application filed February 3, 1891. Serial No. 380,081. (No model.)

*To all whom it may concern:*

Be it known that I, WILLIAM DUNSMORE BOHM, metallurgical chemist, a subject of the Queen of Great Britain and Ireland, residing at 51 Avenue Road, Acton, London, in the county of Middlesex, England, have invented certain Improvements in Apparatus for the Separation of Gold from Ores Containing It, of which the following is a specification.

My invention has for its object to provide an apparatus for the separation of gold from ores or materials containing it in which apparatus large quantities of such ores or materials can be treated at one operation, no injurious fumes being evolved and little manual labor being required chlorination and leaching being effected if desired in but one vessel or vat.

With my improved apparatus I employ bromine or chlorine or a compound yielding chlorine in the ways hereinafter described. In using a compound of chlorine finely divided ore or material (thoroughly roasted when necessary) is mixed with a proper percentage of a chloride such as dry chloride of lime and the mixture is placed in the ore vat and there is pumped or forced through it (at a pressure greater than that of the atmosphere and preferably in an upward direction) an agent which will decompose the chloride such as a dilute solution of sulphuric acid or of hydrochloric acid or of soda carbonate of such strength as will be only sufficient to decompose the chloride gradually or slowly without causing any noxious fumes to arise from the vat. As the liquor is passed or forced through the filter in connection or communication with the ore vat it is returned to the said vat so that it is circulated and repeatedly roused and thus only a very small quantity of solution is required. The solution having been passed through the contents of the vat for a time long enough to insure the dissolution of the gold contained in the ore or material the said solution is allowed to percolate or is pumped from the vat through any suitable precipitant (preferably a metallic sulphide) and afterward water is forced through the ore until all the soluble gold salts are removed such water being then passed through the precipitant to retain any gold present. The ore may now be removed and a fresh charge introduced and this be treated as hereinbefore described. In place of mixing the chloride with the ore or material I may place it in the vat with the said ore or material but separately therefrom.

It is advantageous to use with the acid solution some copper chloride in all cases adding such quantity of acid at a time as may be sufficient to cause the slow regular evolution of chlorine in quantity as required to effect the chlorination. In place of using a chloride I may saturate the ore or material with nitric acid and pump or pass dilute hydrochloric acid through the mass when the requisite chlorine will be generated or I may use chlorine generated elsewhere than in the vat itself and pass it together through the ore or material in the vat in regulated quantity in the manner described, the ore or material being previously damped which may be done by passing steam through it preferably in an upward direction and when the chlorine has been circulated through the ore or material as described with regard to the solution until all the gold has been converted into soluble chloride of gold it may be drained off and passed into the precipitator and the ore washed as hereinbefore described to remove any remaining chloride of gold.

When I employ bromine in place of chlorine a suitable quantity is from one-eighth to two per cent. of the ore or material under treatment. The said bromine is mixed with water to form the leaching solution which is circulated through the contents of the vat as described with regard to the chlorine. In addition to the bromine I may or may not use some chlorine say a quantity equal to that of the bromine employed.

The accompanying drawings represent an apparatus according to my invention.

Figure 1 is an elevation showing the leaching vat in section. Figs. 2 and 3 show an arrangement of the vat bottom to effect rapid discharge of its contents.

I will presume that chlorine is to be used as the agent for dissolving the gold in gold bearing ore and that the circulation is in an upward direction through the vat. The ore to be treated after being roasted and crushed or divided to the desired degree of fineness is mixed with the required percentage of chloride or is treated with chlorine producing material as hereinbefore described and it is then fed into the leaching vat or vessel A in which the decomposition of the chloride or chlorine producing material is effected. The vessel A is provided with a porous or perforated false bottom $a$ covered with filtering medium $a^x$ on which the ore rests and between this false bottom and the bottom proper $a^3$ is the coil of perforated pipe $a^2$ through which the decomposing solution (consisting say for instance of sulphuric acid and water) is forced by means of the pump C from the tub or vessel B into the vessel A to effect the decomposition of the chloride therein. The vessel A is closed at top by a removable lid or cover $A^2$ containing a perforated or porous disk $a^4$ covered by a hood $a^5$ and provided with a rim $a^6$ and clamping screws $a^7$ whereby the cover may be readily fixed and detached. The decomposing solution forced by the pump C from the vessel B through the perforated coil of pipe $a^2$ passes through the perforated or porous false bottom $a$ into the vessel A until it is charged to within a short distance of the top or crown of the hood $a^5$ the said solution entering the hood through the perforations or pores in the disk $a^4$ and cloth $a^0$. $c^3$ is an overflow pipe for conducting the solution and afterward the wash water from the hood $a^5$ into a vessel E so that it may be forced through the vessel G by the pump F. The ore being thus entirely covered with or submerged in the solution the three way cock $c$ in the section pipe $c^2$ of the pump C is turned so as to close the communication between the pump C and the tub B and open a communition between the pump C and the pipe $b^2$ connecting the hood $a^5$ with the suction end of the pump, so that by means of the said pump a continuous circulation of the solution through the pipe $b^2$ and the ore contained in the vessel A is maintained until the decomposition of the chloride and solution of the gold by the chlorine are effected. $B^2$ is a vessel containing sulphuric acid or hydrochloric acid for adding as required to the solution contained in the vessel A, the said vessel $B^2$ communicating therewith by a pipe $b^3$ provided with a cock $b^4$ and connected to the hood $a^5$. Any excess of chlorine gas generated or given off from the solution and tending to escape from it while circulating through the vessel A is conducted by a pipe $a^8$ in connection with the hood $a^5$ into a vessel D containing oxide of lime whereby the escape of noxious fumes is prevented. When the ore in the vessel A has been sufficiently treated with the solution to insure the dissolution of the gold contained in the said ore the pump C is stopped, and the solution is allowed to drain from the vessel A through a pipe $e$ and cock $e^2$ into the tub or vessel E from which it is withdrawn by a pump F through the suction pipe $f$ and forced through the delivery pipe $f^2$ into the precipitator G or it may be allowed to percolate through the precipitator G by leading the pipe thereinto as shown in dotted lines at $g$. The precipitator consists of a series of shallow vessels arranged one above another and having reticulated, perforated or porous bottoms upon which is placed a suitable solid precipitant (preferably a metallic sulphide) through which the solution is forced in either an upward or a downward direction as desired. When the whole of the solution has drained from the vessel A water is forced (preferably upward as in the case of the solution) through the ore to remove any remaining soluble gold salts therefrom the water passing from the vessel through the pipe $c^3$ into the vessel E whence it is taken by the suction pipe $f$ of the pump F and forced through the precipitator G to retain any gold that may be present or it may be allowed to percolate through the vessel G without the use of the pump F.

If sulphide of copper be used in the process as a precipitant the solution containing the copper may be conducted from the precipitator G by the pipe $g$ into a vessel H containing bars of iron whereby the dissolved copper is precipitated.

To facilitate the discharge of the spent ore from the vessel A the bottom $A^3$ thereof may be hinged to a flange $h$ on the body of the vessel as shown at $h^2$ in Figs. 2 and 3 and secured in its closed position by bolts and nuts $i$ as shown, or by any other suitable fastening. The bottom $A^3$ contains the false bottom and filtering medium and is attached to a chain or the like $k$ passing over a pulley $l$ and connected to any suitable hauling device whereby the bottom may be raised and lowered with facility, the connections of the pipes being arranged or the pipes made flexible to allow of this movement.

Having now particularly described and ascertained the nature of my said invention and in what manner the same is to be performed, I declare that what I claim is—

1. In and for the treatment of gold bearing ores or materials the combination of the vat A having a perforated false bottom $a$ covered with filtering material, a perforated top $a^4$ and hood $a^5$, perforated pipes beneath the false bottom and a pipe $b^2$ in communication with the hood, the said pipes being connected to a pump or forcing devices by which the solution is forced at a pressure greater than atmospheric pressure up through the contents of the vat and a circulation thereof is obtained, substantially as hereinbefore described.

2. In and for the treatment of gold bearing ores or materials, the combination of a vat A having a perforated false bottom and a filter, a closed top having a discharge pipe, a receptacle E, pipe connections between the receptacle E and the discharge pipe and with the lower part of the vat, a precipitator connected to the receptacle E, a pump F with pipe connections with the receptacle E and precipitator, a supply tub B having pipe connections with both the upper and the lower parts of the vat A and a pump C in the last named piping, all substantially as and for the purposes set forth.

In testimony whereof I have signed my name to this specification in the presence of two subscribing witnesses.

WM. D. BOHM.

Witnesses:
PERCY R. JOELLRINS,
JOHN MAYO SMITH,
*Clerks to Messrs. John Newton & Sons, Public Notaries, 9 Birchin Lane, London, E. C.*